US012456814B2

(12) United States Patent
Zhang et al.

(10) Patent No.: US 12,456,814 B2
(45) Date of Patent: Oct. 28, 2025

(54) ANTENNA AND ELECTRONIC DEVICE

(71) Applicant: Huawei Technologies Co., Ltd., Shenzhen (CN)

(72) Inventors: Chen Zhang, Xi'an (CN); Xiaofeng Li, Xi'an (CN); Hanyang Wang, Reading (GB)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 396 days.

(21) Appl. No.: 17/788,883

(22) PCT Filed: Oct. 30, 2020

(86) PCT No.: PCT/CN2020/125436
§ 371 (c)(1),
(2) Date: Jun. 24, 2022

(87) PCT Pub. No.: WO2021/129148
PCT Pub. Date: Jul. 1, 2021

(65) Prior Publication Data

US 2023/0022305 A1 Jan. 26, 2023

(30) Foreign Application Priority Data

Dec. 27, 2019 (CN) ......................... 201911378073.3

(51) Int. Cl.
*H01Q 13/10* (2006.01)
*H01P 5/10* (2006.01)
(Continued)

(52) U.S. Cl.
CPC ............. *H01Q 13/106* (2013.01); *H01P 5/10* (2013.01); *H01Q 1/2291* (2013.01); *H01Q 9/285* (2013.01); *H01Q 21/29* (2013.01)

(58) Field of Classification Search
CPC ...... H01Q 13/10; H01Q 1/2291; H01Q 9/285; H01Q 21/29; H01Q 9/28; H01Q 1/38; H01Q 1/48; H01Q 1/50; H01P 5/10
See application file for complete search history.

(56) References Cited

U.S. PATENT DOCUMENTS 6,211,840 B1 4/2001 Wood et al.
8,203,497 B2 6/2012 Sabban
(Continued)

FOREIGN PATENT DOCUMENTS

CN 201163660 Y 12/2008
CN 102067380 A 5/2011
(Continued)

OTHER PUBLICATIONS

Michishita N et al, "A Novel Impedance Matching Structure for a Dielectric Loaded 0.05 Wavelength Small Meander Line Antenna," XP010944021, IEEE Antennas and Propagation Society International Symposium, Jul. 9-14, 2006, 4 pages.
(Continued)

*Primary Examiner* — Dameon E Levi
*Assistant Examiner* — Michael M Bouizza
(74) *Attorney, Agent, or Firm* — Conley Rose, P.C.

(57) ABSTRACT

An antenna includes a radiator and a balun structure. The radiator includes a first branch for a first current to flow through and a second branch for a second current to flow through. The first branch and the second branch are arranged on two opposite sides of the balun structure. A direction of the first current is at least partially opposite to that of the second current. The first branch is spaced from the balun structure by a first slot. The second branch is spaced from the balun structure by a second slot. The first slot is configured to form a first horizontally-radiated electric field by the first current and a current on the balun structure. The second slot
(Continued)

is configured to form a second horizontally-radiated electric field by the second current and the current on the balun structure.

16 Claims, 17 Drawing Sheets

(51) Int. Cl.
*H01Q 1/22* (2006.01)
*H01Q 9/28* (2006.01)
*H01Q 21/29* (2006.01)

(56) References Cited

U.S. PATENT DOCUMENTS

| | | | | |
|---|---|---|---|---|
| 2006/0109192 | A1* | 5/2006 | Weigand | H01Q 9/40 343/700 MS |
| 2009/0284432 | A1* | 11/2009 | Cozzolino | H01Q 9/42 29/601 |
| 2013/0057442 | A1 | 3/2013 | Brown et al. | |
| 2015/0102974 | A1 | 4/2015 | Stoytchev et al. | |
| 2015/0109167 | A1 | 4/2015 | Yarga et al. | |
| 2015/0200457 | A1 | 7/2015 | Chan et al. | |
| 2016/0344103 | A1 | 11/2016 | Khalil et al. | |
| 2017/0201027 | A1 | 7/2017 | Cozzolino et al. | |
| 2018/0191083 | A1 | 7/2018 | Daojian et al. | |
| 2018/0366829 | A1 | 12/2018 | Hsu et al. | |
| 2020/0411951 | A1 | 12/2020 | Shen et al. | |

FOREIGN PATENT DOCUMENTS

| | | | |
|---|---|---|---|
| CN | 103985958 | A | 8/2014 |
| CN | 104577308 | A | 4/2015 |
| CN | 204257813 | U | 4/2015 |
| CN | 105140632 | A | 12/2015 |
| CN | 106654557 | A | 5/2017 |
| CN | 106797075 | A | 5/2017 |
| CN | 106887707 | A | 6/2017 |
| CN | 206628582 | U | 11/2017 |
| CN | 208401038 | U | 1/2019 |
| CN | 109546322 | A | 3/2019 |
| CN | 209104361 | U | 7/2019 |
| CN | 110336130 | A | 10/2019 |
| CN | 110350303 | A | 10/2019 |
| EP | 3104461 | A1 | 12/2016 |
| JP | H08250916 | A | 9/1996 |
| JP | 2003309428 | A | 10/2003 |
| WO | 2017180470 | A1 | 10/2017 |

OTHER PUBLICATIONS

Ke Sin Yan et al: "Compact asymmetric dipole antenna with U-shape structure for wireless cable modem application," XP033057901, IEEE 5th Asia-Pacific Conference on Antennas and Propagation, Jul. 26-29, 2016, 2 pages.

Ma Tian-ming, et al, "Design of an Omni-directional Radiating Antenna Using Printed Dipoles," Journal of Microwaves, vol. 26, No. 6, Jun. 2010, 5 pages.

* cited by examiner

ANTENNA AND ELECTRONIC DEVICE

CROSS-REFERENCE TO RELATED APPLICATIONS

This is a U.S. National Stage of International Patent Application No. PCT/CN2020/125436 filed on Oct. 30, 2020, which claims priority to Chinese Patent Application No. 201911378073.3 filed on Dec. 27, 2019, both of which are hereby incorporated by reference in their entireties.

TECHNICAL FIELD

This application relates to the field of communications technologies, and in particular, to an antenna and an electronic device.

BACKGROUND

An existing customer premise equipment (Customer Premise Equipment, CPE) product focuses on Wi-Fi performance. With research on forms and wiring of wall-mounted Wi-Fi antennas, better horizontal and vertical coverage is achieved. Currently, most Wi-Fi antenna design schemes use dipole, IFA, and other solutions, and Wi-Fi operation is mostly implemented by using a dual-branch design. However, both solutions have some disadvantages. For example, a main problem of the IFA solution is that space needs to be reserved on a board, and antenna pattern roundness on a horizontal plane is poor due to impact of a PCB. A main problem of a dipole solution with a balun structure is that only horizontal plane coverage can be ensured, and vertical plane coverage is poor. Therefore, a favorable Wi-Fi antenna is urgently needed to improve performance of customer premise equipment.

SUMMARY

This application provides an antenna and an electronic device, to improve Wi-Fi performance of an electronic device and improve a communication effect of the electronic device.

According to a first aspect, an antenna is provided. The antenna is a combination of a dipole antenna and a slot antenna, and the antenna includes a radiator and a balun structure configured to feed the radiator The radiator includes a first branch for a first current to flow through and a second branch for a second current to flow through. The first branch and the second branch are arranged on two opposite sides of the balun structure, and serve as two branches of the dipole antenna. A direction of the first current is at least partially opposite to that of the second current. The first branch is spaced from the balun structure by a first slot. The second branch is spaced from the balun structure by a second slot. The first slot and the second slot serve as slot antennas. The first slot is configured to form a first horizontally-radiated electric field by the first current and a current on the balun structure. The second slot is configured to form a second horizontally-radiated electric field by the second current and the current on the balun structure. In the foregoing technical solution, through coordination of the slots with the first branch and the second branch, radiation in both horizontal and vertical directions of the antenna is enhanced and antenna pattern roundness is increased.

In a specific implementable solution, a width of each of the first slot and the second slot ranges from 0.5 mm to 4 mm. For example, the width is 0.5 mm, 0.8 mm, 1 mm, 1.5 mm, 2 mm, 3 mm, 4 mm, or the like. This ensures that an electric field can be formed between branches on both sides of a slot and the balun structure.

In a specific implementable solution, the width of the first slot and the width of the second slot may be the same or different. Regardless of whether they are the same or different, it needs to be ensured that the width of each of the first slot and the second slot ranges from 0.5 mm to 4 mm.

In a specific implementable solution, the balun structure is U-shaped, and the balun structure includes a strip-shaped first structure and a strip-shaped second structure The first branch is connected to the first structure, and the first slot is formed between the first branch and the first structure.

The second branch is connected to the second structure, and the second slot is formed between the second branch and the second structure. Two different structures one-to-one correspond to two branches to form electric fields.

In a specific implementable solution, the balun structure further includes a feed point and a ground point; and the feed point is disposed on the first structure, and the ground point is disposed on the second structure.

In a specific implementable solution, one end of the first structure that is connected to the first branch is provided with a protrusion facing the second structure, and the feed point is disposed at the protrusion. The protrusion position facilitates disposing of the feed point.

In a specific implementable solution, the first branch and the second branch are symmetrical structures. A roundness effect in the horizontal direction is improved.

In a specific implementable solution, a current path length of the first branch is 0.15 to 0.35 times a wavelength corresponding to an operating band of the antenna; and a current path length of the second branch is 0.15 to 0.35 times the wavelength corresponding to the operating band of the antenna.

In a specific implementable solution, a current path length from the ground point to the teed point of the balm structure is ½ of the wavelength corresponding to the operating hand of the antenna.

In a specific implementable solution, the first branch is L-shaped, the second branch is L-shaped, and a current path length of a vertical part of the first branch is equal to a current path length of a vertical part of the second branch. A vertical electric field is generated by using a horizontal part of the second branch.

According to a second aspect, an electronic device is provided, where the electronic device includes a housing, a support layer disposed in the housing, and the antenna as in the aforementioned aspects, that is disposed at the support layer. In the foregoing technical solution, through coordination of the slots with the first branch and the second branch, radiation in both the horizontal and vertical directions of the antenna is enhanced and antenna pattern roundness is increased.

According to a third aspect, an antenna is provided, where the antenna includes a balun structure and a radiator unit. The balun structure is a U-shaped structure. The U-shaped structure includes a first structure, a second structure, and a third structure. The first structure and the second structure are arranged on two sides of the third structure, and are respectively connected to two opposite ends of the third structure in a one-to-one correspondence. The radiator unit includes a first branch located on one side of the U-shaped structure and a second branch located on the other side of the U-shaped structure. The first branch includes a first strip-shaped structure. The first strip-shaped structure and the first structure are connected to each other and have a first slot in between. The second branch includes a second strip-shaped structure. The second strip-shaped structure and the second structure are connected to each other and have a second slot in between. In the foregoing technical solution, through coordination of the slots with the first branch and the second branch, radiation in both horizontal and vertical directions of the antenna is enhanced and antenna pattern roundness is increased.

In a specific implementable solution, the first branch is an inverted L-shaped structure, and the first branch includes the first strip-shaped structure and a third strip-shaped structure connected to the first strip-shaped structure. The first strip-shaped structure is connected to the first structure by using the third strip-shaped structure. A width of the first slot is limited by a length of the third strip-shaped structure.

In a specific implementable solution, the second branch is an inverted L-shaped structure, and the second branch includes the second strip-shaped structure and a fourth strip-shaped structure connected to the second strip-shaped structure. The second strip-shaped structure is connected to the second structure by using the fourth strip-shaped structure. A width of the first slot is limited by a length of the fourth strip-shaped structure.

DESCRIPTION OF EMBODIMENTS

To facilitate understanding of an antenna provided in the embodiments of this application, the following first describes an application scenario of the antenna provided in the embodiments of this application. The antenna provided in the embodiments of this application is applied to an electronic device. The electronic device is actually a mobile signal access device that receives a mobile signal and forwards the mobile signal by using a wireless Wi-Fi signal. The electronic device is also a device that converts a high-speed 4G or 5G signal into a Wi-Fi and may support a relatively large quantity of mobile terminals to access the Internet concurrently. The electronic device may be widely applied to wireless network access in rural areas, towns, hospitals, companies, factories, and residential communities, to save costs of deploying wired networks. However, in conventional technologies, when an antenna of an electronic device is used, horizontal plane coverage and vertical plane coverage cannot be simultaneously ensured, resulting in a relatively poor communication effect. Therefore, the embodiments of this application provide an antenna to improve a communication effect of a customer premise terminal.

Figure 1:
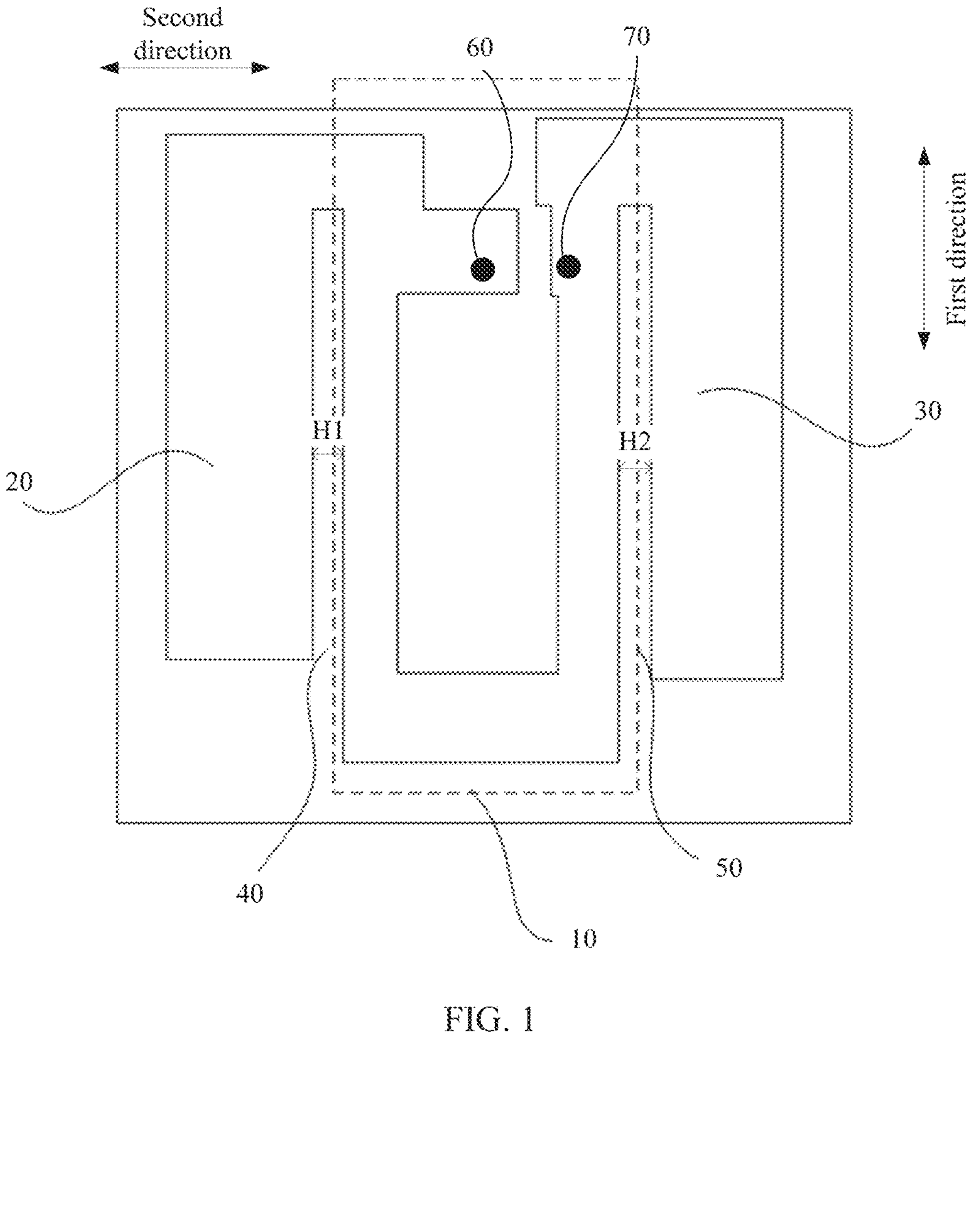
FIG. 1 is a schematic diagram of a structure of an NFC antenna according to an embodiment of this application.

FIG. 1 is a schematic diagram of a structure of an antenna according to an embodiment of this application. The antenna shown in FIG. 1 includes two parts: a radiator and a balun structure 10. The balun structure 10 is configured to feed the radiator, and the radiator is configured to radiate a signal.

Refer to FIG. 1. The balun structure 10 provided in this embodiment of this application is disposed on a substrate in an electronic device. The balun structure 10 may be a common conductive medium disposed on the substrate, such as a metal layer, a flexible circuit board, or a metal sheet. The balun structure in this embodiment of this application refers to a component or structure that implements feed conversion from an unbalanced structure (a coaxial cable) to a balanced structure (a dipole). In this application, the balun structure is configured to invert a phase of a feed leakage current by using a cable of a ½ wavelength (a wavelength corresponding to an operating band of the antenna), so as to offset a leakage current on a ground, and achieve a balanced feeding function. In specific setting, a connection feed structure of the ½ wavelength may be implemented between a feed point 60 and a ground point 70 in different forms, for example, by using a U-shaped structure shown in FIG. 1. It should be understood that, a structure that meets any of the foregoing dimensional conditions may be used as the balun structure in this embodiment of this application.

Figure 2:
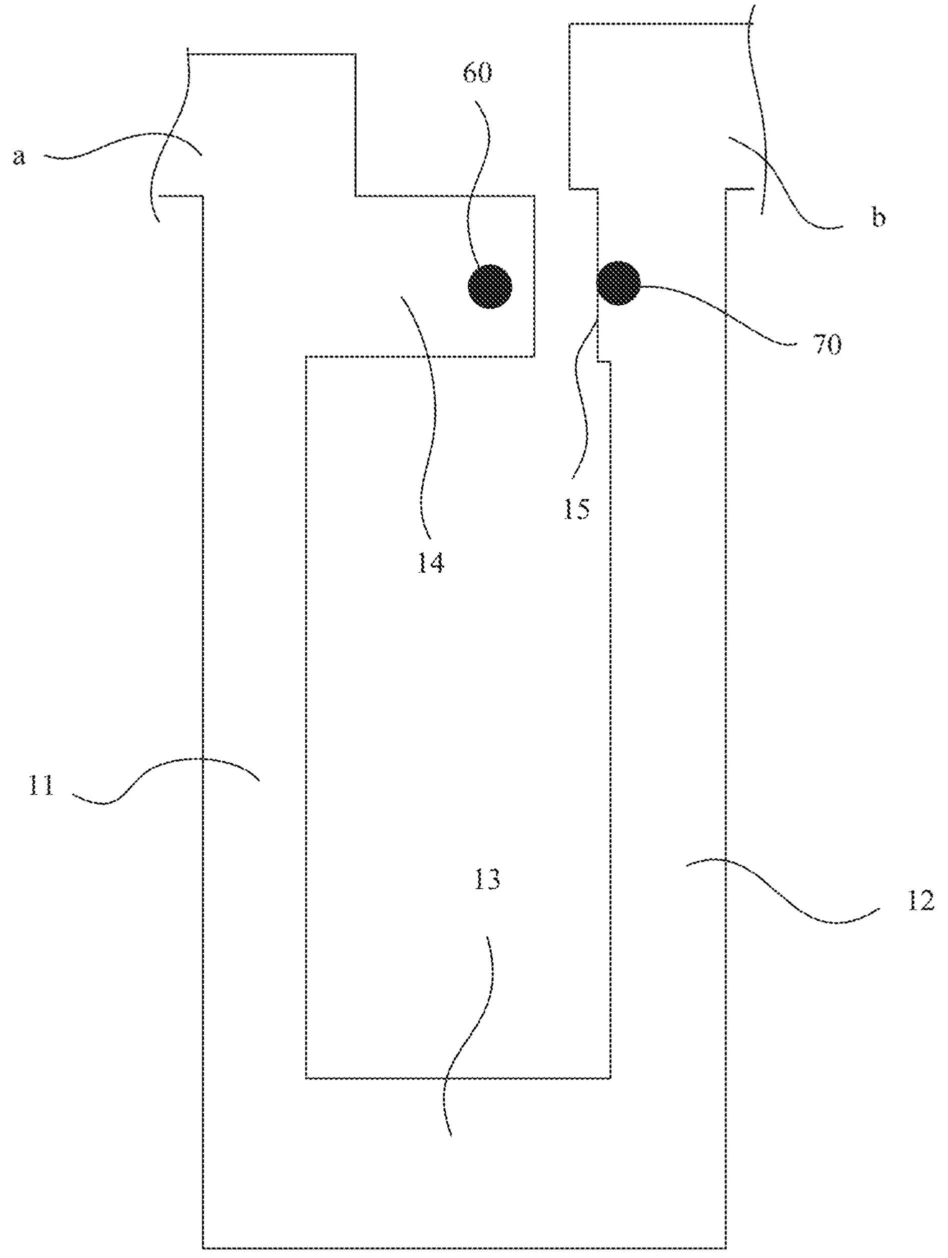
FIG. 2 is a schematic diagram of a balun structure according to an embodiment of this application.

FIG. 2 is a specific schematic diagram of the balun structure 10. The balun structure 10 is a U-shaped structure with an opening at one end. For ease of description, the bawl structure is divided into a first structure 11, a second structure 12, and a third structure 13. The first structure 11 and the second structure 12 are long strip-shaped structures in a first direction indicated by an arrow shown in FIG. 2, the third structure 13 is located between the first structure 11 and the second structure 12, and the third structure 13 is connected to both the first structure 11 and the second structure 12 to forma the U-shaped structure. Two ends of the U-shaped structure are a first end a of the first structure 11 and a second end b of the second structure 12. Refer to FIG.

2. The first structure 11, the second structure 12, and the third structure 13 are all rectangular strip-shaped structures. However, a specific shape is not limited in this embodiment of this application. The first structure 11, the second structure 12, and the third structure 13 provided in this embodiment of this application may also use another shape. Still refer to FIG. 2. When the first structure 11 and the second structure 12 are disposed, widths of the first structure 11 and the second structure 12 may be equal or approximately equal, which is not specifically limited herein. In addition, the first structure 11 and the second structure 12 are parallel to each other in the first direction. However, in this embodiment of this application, the first structure 11 and the second structure 12 may alternatively be approximately parallel to each other. For example, the first structure 11 and the second structure 12 may each form a particular angle with the first direction, for example, 2°, 5°, or another different angle.

Still refer to FIG. 2. The balun structure 10 further includes the feed point 60 and the ground point 70. The feed point 60 is configured to be connected to an antenna front-end component of the electronic device, and the front-end component includes common antenna components such as a phase shifter and a power splitter. Still refer to FIG. 2. The feed point 60 is disposed on the first structure 11, and the feed point 60 is located at the end with the U-shaped opening of the balm structure 10. To facilitate disposing of the feed point 60, a first protrusion 14 is disposed at an end of the first structure 11 that is away from the third structure 13, and the feed point 60 is disposed at the first protrusion 14. The ground point 70 is disposed on the second structure 12, and the ground point 70 is located at the end with the U-shaped opening of the balun structure. To facilitate disposing of the ground point 70, a second protrusion 15 is disposed at an end of the second structure 12 that is away from the third structure 13, and the ground point 70 is disposed at the second protrusion 15.

Still refer to FIG. 2. When the balun structure 10 is disposed, a current path length from the ground point 70 to the feed point 60 of the balun structure 10 is ½ of the wavelength corresponding to the operating band of the antenna. The current path length from the ground point 70 to the feed point 60 of the balun structure 10 is a current path length from the feed point 60 to the third structure 13, or a current path length from the ground point 70 to the third structure 13. In this embodiment of this application, that a current path length from the ground point 70 to the feed point 60 of the balun structure 10 is ½ of the wavelength corresponding to the operating band of the antenna indicates: the current path length from the ground point 70 to the feed point 60 of the balun structure 10 is equal to or approximately equal to ½ of the wavelength corresponding to the operating band of the antenna, that is, a definition in this embodiment of this application may be met when the current path length from the ground point 70 to the feed point 60 of the balun structure 10 is close to ½ of the wavelength corresponding to the operating band of the antenna.

Refer to FIG. 1. The radiator provided in this embodiment of this application includes two parts: a first branch 20 and a second branch 30. The first branch 20 and the second branch 30 serve as two branches of a dipole antenna. Therefore, the first branch 20 and the second branch 30 are disposed as approximately symmetrical structures. As shown in FIG. 1, the first branch 20 and the second branch 30 are arranged on two sides of the balun structure 10, the first branch 20 is connected to an end of the first structure 11, and the second branch 30 is connected to an end of the second structure 12. The following separately describes the first branch 20 and the second branch 30.

Figure 3:
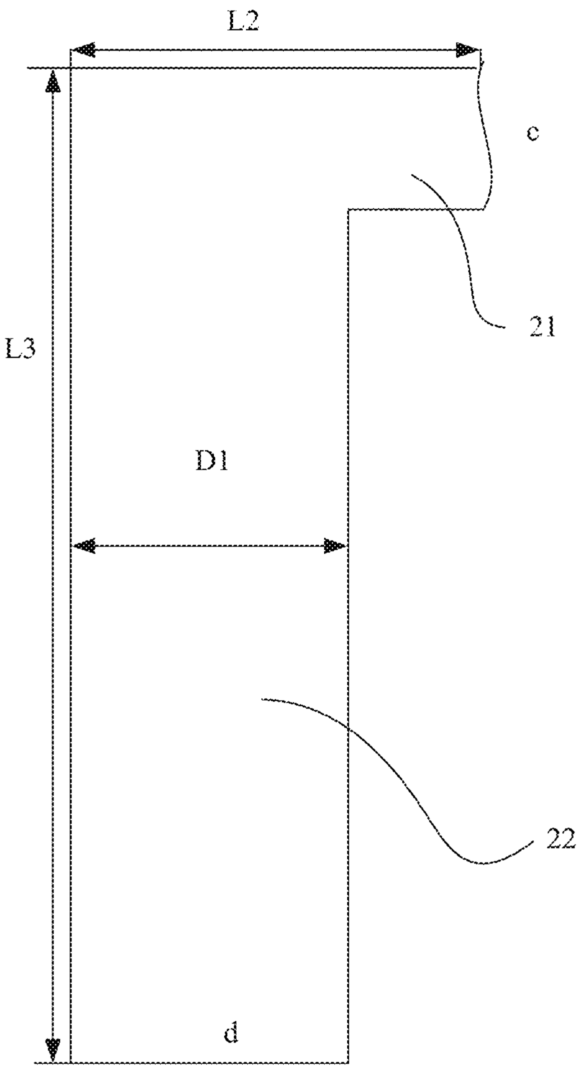
FIG. 3 is a schematic diagram of a structure of a first branch according to an embodiment of this application.

FIG. 3 shows a structure of the first branch 20. The first branch 20 shown in FIG. 3 is an inverted L-shaped structure. For ease of description, the first branch 20 is divided into a first part 21 and a second part 22. The first part 21 and the second part 22 are an integrated structure. A length direction of the first part 21 is in a second direction, and the first part 21 has a third end c away from the second part 22. A length direction of the second part 22 is in the first direction, and the second part 22 has a fourth end d away from the first part 21. Refer to FIG. 3. A width D1 of the first branch 20 ranges from 1 mm to 4 mm. For example, the width D1 of the first branch 20 may be 1 mm, 2 mm, 3 mm, 4 mm, or a different width. A current path length of the first branch 20 is ¼ of the wavelength corresponding to the operating band of the antenna, or 0.15 to 0.35 times the wavelength, such as 0.15, 0.2, 0.25, 0.3, or 0.35 times. As shown in FIG. 3, the current path length L1 of the first branch 20 is equal to a sum of a length L2 of the first part 21 and a length L3 of the second part 22: L1=L2+L3. When connected to the balun structure 10, the third end c of the first part 21 is connected to the first end a of the first structure 11, and the second part 22 is parallel or approximately parallel to the first structure 11. Refer to FIG. 1 and FIG. 3. The first branch 20 includes a first slot 40 between the second part 22 and the first structure 11. A width 111 of the first slot 40 ranges from 0.5 mm to 4 mm, to ensure that a stable first horizontally-radiated electric field can be formed between the first branch 20 and the first structure 11. For example, the width H1 of the first slot 40 may be 0.5 mm, 1 mm, 1.5 mm, 2 mm, 2.5 mm, 3 mm, 3.5 mm, 4 mm, or another different width.

Figure 4:
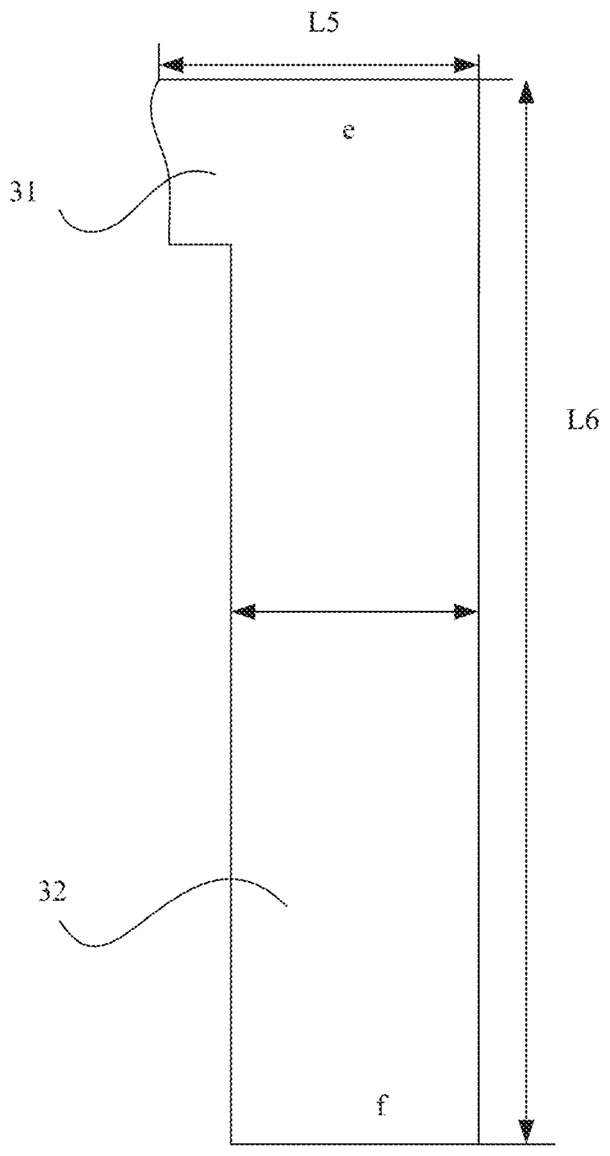
FIG. 4 is a schematic diagram of a structure of a second branch according to an embodiment of this application.

FIG. 4 shows a structure of the second branch 30. The second branch 30 shown in FIG. 4 is an inverted L-shaped structure. For ease of description, the second branch 30 is divided into a third part 31 and a fourth part 32. The third part 31 and the fourth part 32 are an integrated structure. A length direction of the third part 31 is in the second direction, and the third part 31 has a third end e away from the fourth part 32. A length direction of the fourth part 32 is in the first direction, and the fourth part 32 has a fourth end f away from the third part 31. Refer to FIG. 4. A width D2 of the second branch 30 ranges from 1 mm to 4 mm. For example, the width D2 of the second branch 30 may be 1 mm, 2 mm, 3 mm, 4 mm, or a different width. A current path length of the second branch 30 is ¼ of the wavelength corresponding to the operating band of the antenna, or 0.15 to 0.35 times the wavelength, such as 0.15, 0.2, 0.25, 0.3, or 0.35 times. As shown in FIG. 4, the current path length L4 of the second branch 30 is equal to a sum of a length L5 of the third part 31 and a length L6 of the fourth part 32: L4=L5+L6. When connected to the balun structure 10, the third end e of the third part 31 is connected to the second end b of the second structure 12, and the fourth part 32 is parallel or approximately parallel to the second structure 12. A second slot 50 exists between the fourth part 32 and the second structure 12. A width H2 of the second slot 50 ranges from 0.5 mm to 4 mm, to ensure that a stable second horizontally-radiated electric field can be formed between the second branch 30 and the second structure 12. For example, the width H2 of the second slot 50 may be 1 mm, 1 mm, 1.5 mm 2 mm 2.5 mm, 3 mm, 3.5 mm, 4 mm or another different width.

It should be understood that, when the first branch 20 and the second branch 30 are specifically disposed, the first branch 20 and the second branch 30 may be exactly the same or may be approximately the same. For example, in the structure shown in FIG. 3, the first branch 20 and the second branch 30 are symmetrical structures. Therefore, the structures of the first branch the first branch 20 is approximately equal to the second branch 30, the first branch 20 and the second branch 30 are both L-shaped, and only differ in size. For example, if L3 and L6 are not identical, L3>L6 or L3<L6. For the widths of the first slot 40 and the second slot 50, the first slot 40 and the second slot 50 may have an equal width, or have an approximately equal width, to ensure that a stable electric field can be formed between structures (the first structure 11 and the second part 22; and the fourth part 32 and the second structure 12) located on two sides of a slot.

In the foregoing structure, the antenna has two modes: a dipole mode and a slot mode. The dipole mode is implemented by using the first part 21 and the third part 31 in the two radiation branches of the antenna, and the third structure 13 in the balun structure 10. The slot mode is implemented by using the second part 22 in the radiation branch, the first structure 11, and the first slot 40 in between; and the fourth part 32 in the radiation branch, the second structure 12, and the second slot 50 in between. To facilitate understanding of the two modes of the antenna provided in this embodiment of this application, the following describes the antenna provided in this embodiment of this application with reference to a current diagram of the antenna.

Figure 5:
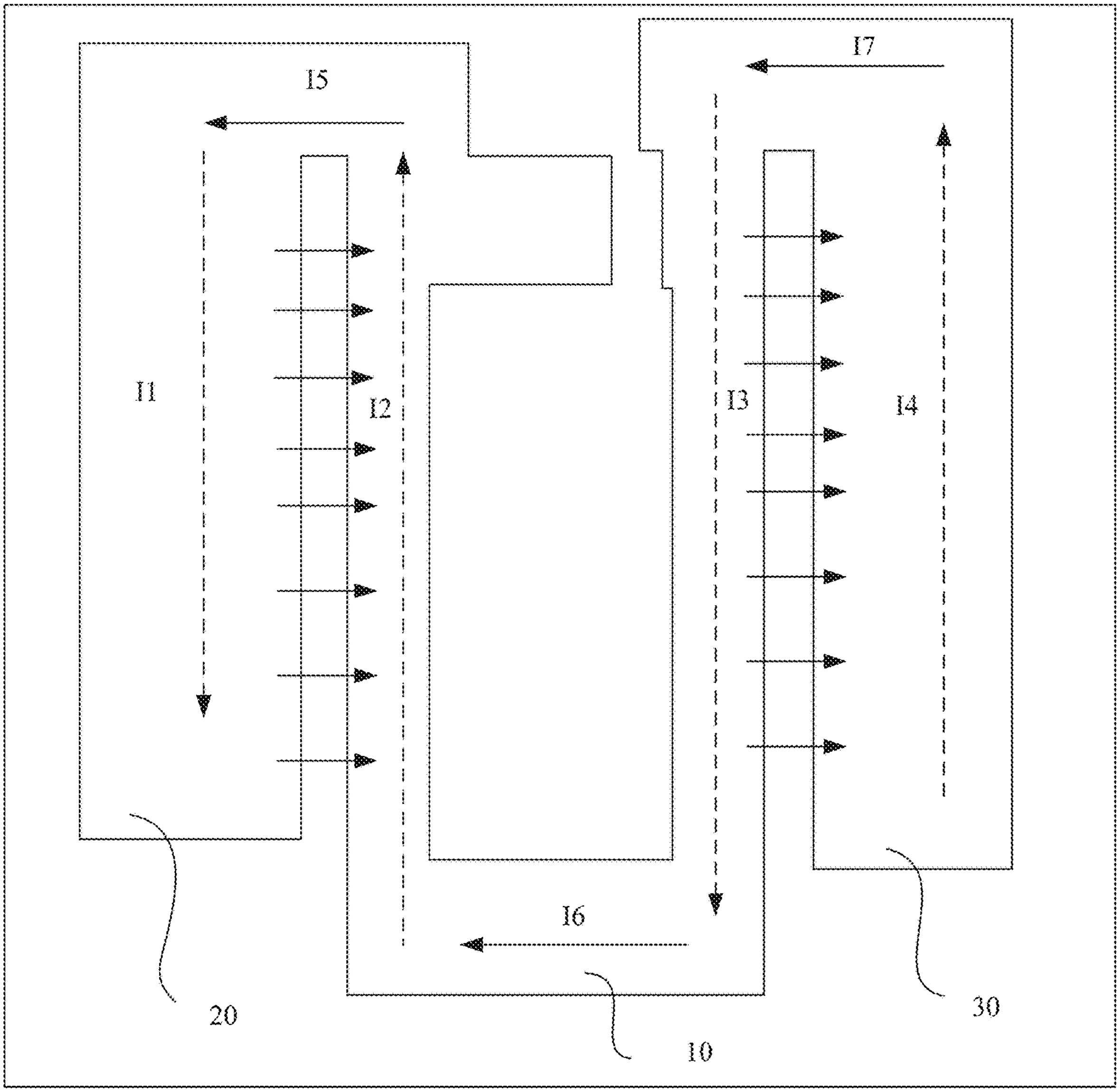
FIG. 5 is a schematic diagram of a current generated when an antenna works at 2.4G according to an embodiment of this application.

FIG. 5 is a schematic diagram of a current generated when the antenna works at 2.4G according to an embodiment of this application. It can be learned from the current diagram shown in FIG. 5 that, the current includes a current in the first direction and a current in the second direction. In FIG. 5, the current flowing in the first direction is denoted by a dashed line arrow, and the current flowing in the second direction is denoted by a solid line arrow. It can be learned from FIG. 5 that, the current flowing in the first direction includes four parts: a current I1 flowing in the second part 22, a current I2 flowing on the first structure 11, a current I3 flowing on the second structure 12, and a current I4 flowing in the fourth part 32. The current I1 and the current I2 are respectively on two sides of the first slot 40. The current I3 and the current I4 are respectively on two sides of the second slot 50. The current I1 and the current I2 form the first horizontally-radiated electric field in the first slot 40. The first horizontally-radiated electric field points from the first branch 20 to the balun structure 10. The current I3 and the current I4 form the second horizontally-radiated electric field in the second slot 50. The second horizontally-radiated electric field points from the balun structure 10 to the second branch 30. In this way, the slot mode is generated between the branches and the balm) structure 10, and corresponding compensation is performed for coverage on a horizontal plane (parallel to a plane for disposing the antenna or a plane on which the antenna is located) of the antenna, to ensure that antenna pattern roundness of the antenna is approximately 8 dB on the horizontal plane.

Refer to FIG. 5. The current flowing in the second direction includes three parts: a current I5 flowing in the first part 21, a current I6 flowing in the third structure 13, and a current I7 flowing in the third part 31. It can be learned from FIG. 5 that, the current I5, the current I6, and the current I7 all flow in the second direction, and have a same flowing direction. The current I5, the current I6, and the current I7 form a current flowing direction of the antenna in the dipole mode, and mainly form a directivity pattern on a vertical plane (a plane perpendicular to the horizontal plane).

Figure 6:
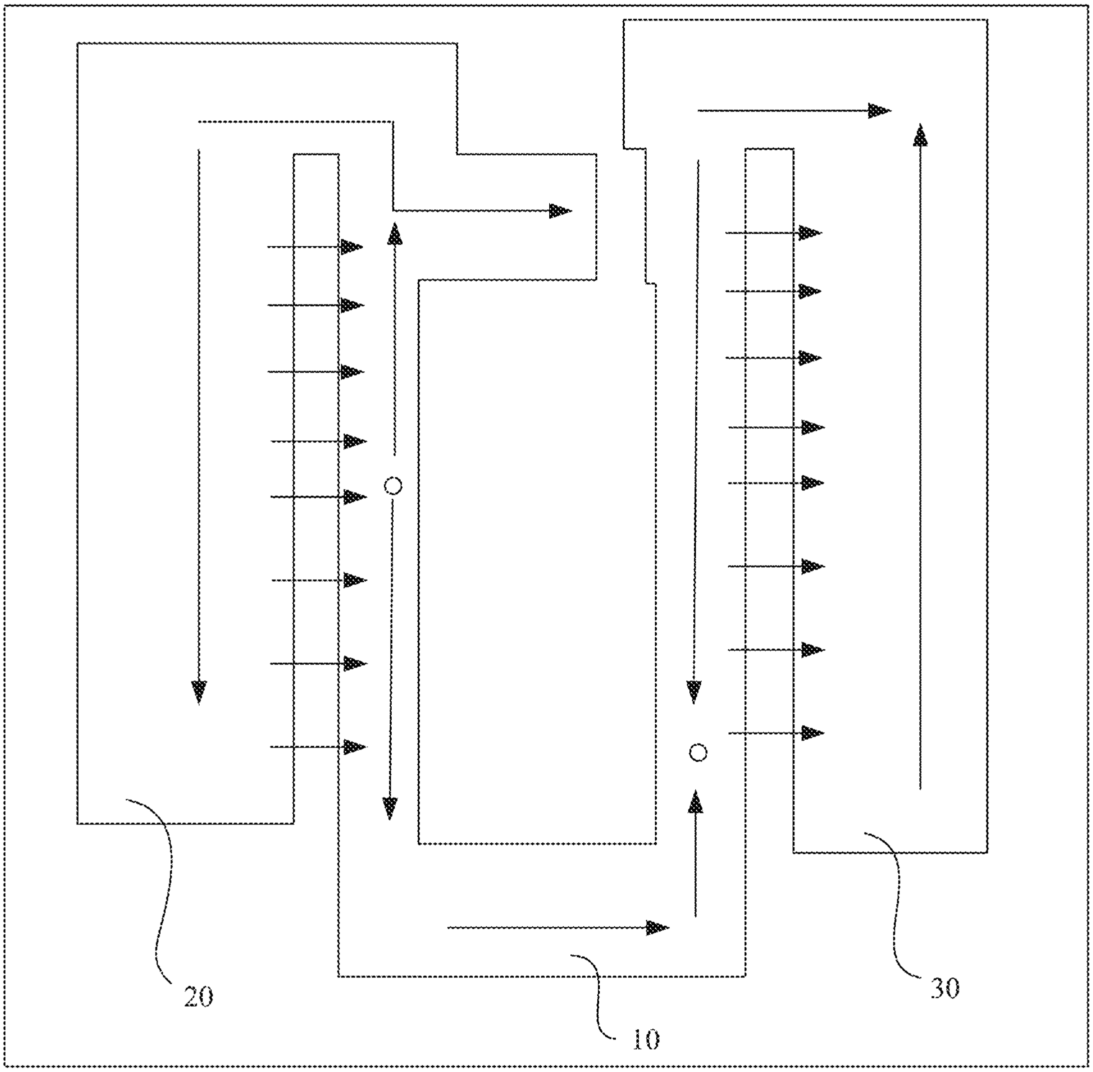
FIG. 6 is a schematic diagram of a current generated when an antenna works at 5G according to an embodiment of this application.

FIG. 6 is a schematic diagram of a current generated when the antenna works at 5G. A circle denotes that a current has an opposite flowing direction at this point. A horizontal electric field may also be generated in the first slot between the first part of the balun structure 10 and the first branch 20. A horizontal electric field may also be generated in the second slot between the second part of the balun structure 10 and the second branch 30. In this way, the slot mode is generated between the branches and the balun structure 10, and corresponding compensation is performed for coverage on the horizontal plane (parallel to a plane for disposing the antenna or a plane on which the antenna is located) of the antenna, to ensure that antenna pattern roundness of the antenna is approximately 8 dB on the horizontal plane.

It can be learned from the currents shown in FIG. 5 and FIG. 6 that, the antenna provided in this embodiment of this application may have good antenna pattern roundness on the horizontal and vertical plane. To show an effect of the antenna provided in this embodiment of this application, the following provides a comparison with an antenna in the conventional technologies by using a specific example.

Figure 7:
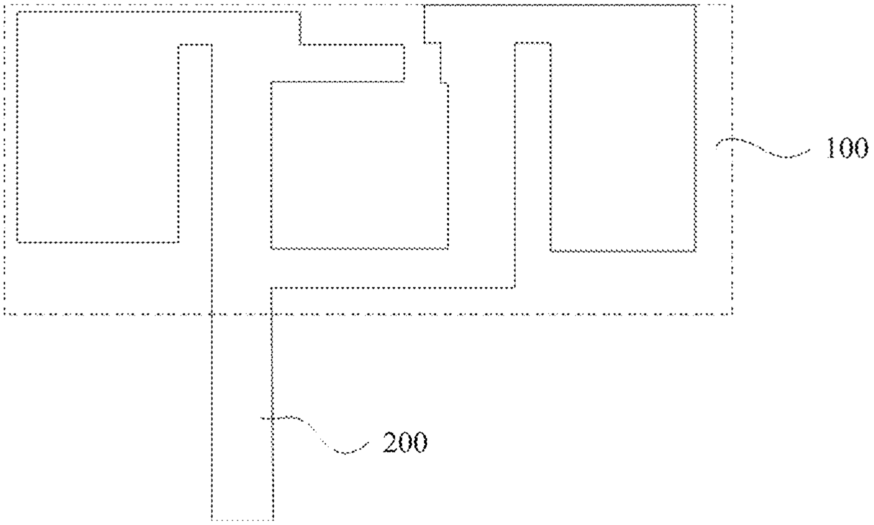
FIG. 7 is a schematic diagram of a structure of an antenna used for simulation according to an example of this application.
Figure 8:
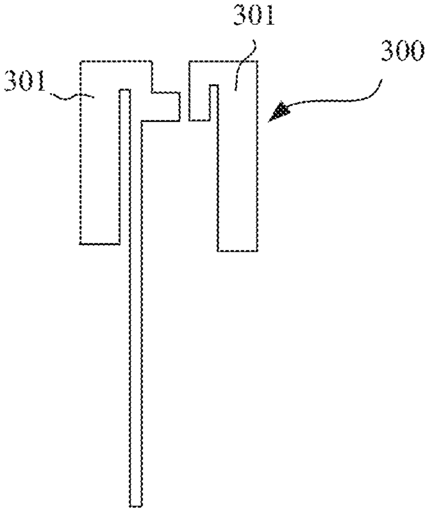
FIG. 8 is a schematic diagram of a structure of a comparison antenna according to an embodiment of this application.
Figure 9:
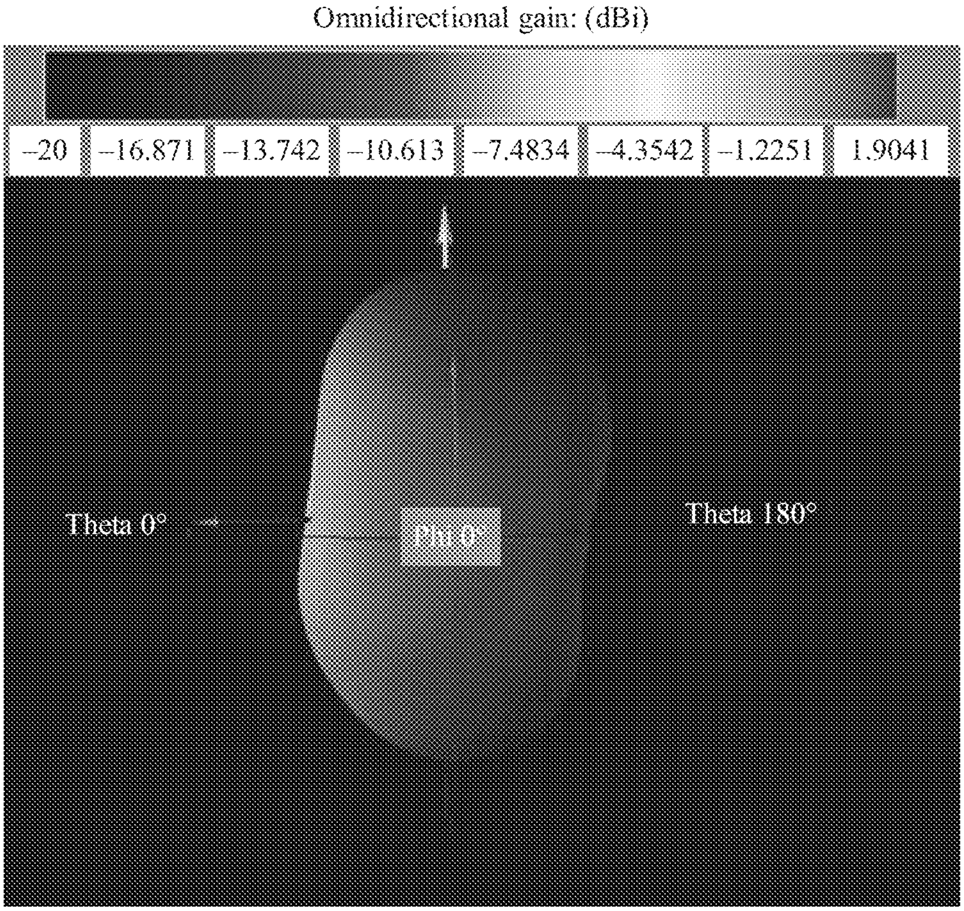
FIG. 9 shows a 3D directivity pattern of the antenna shown in FIG. 7.
Figure 10:
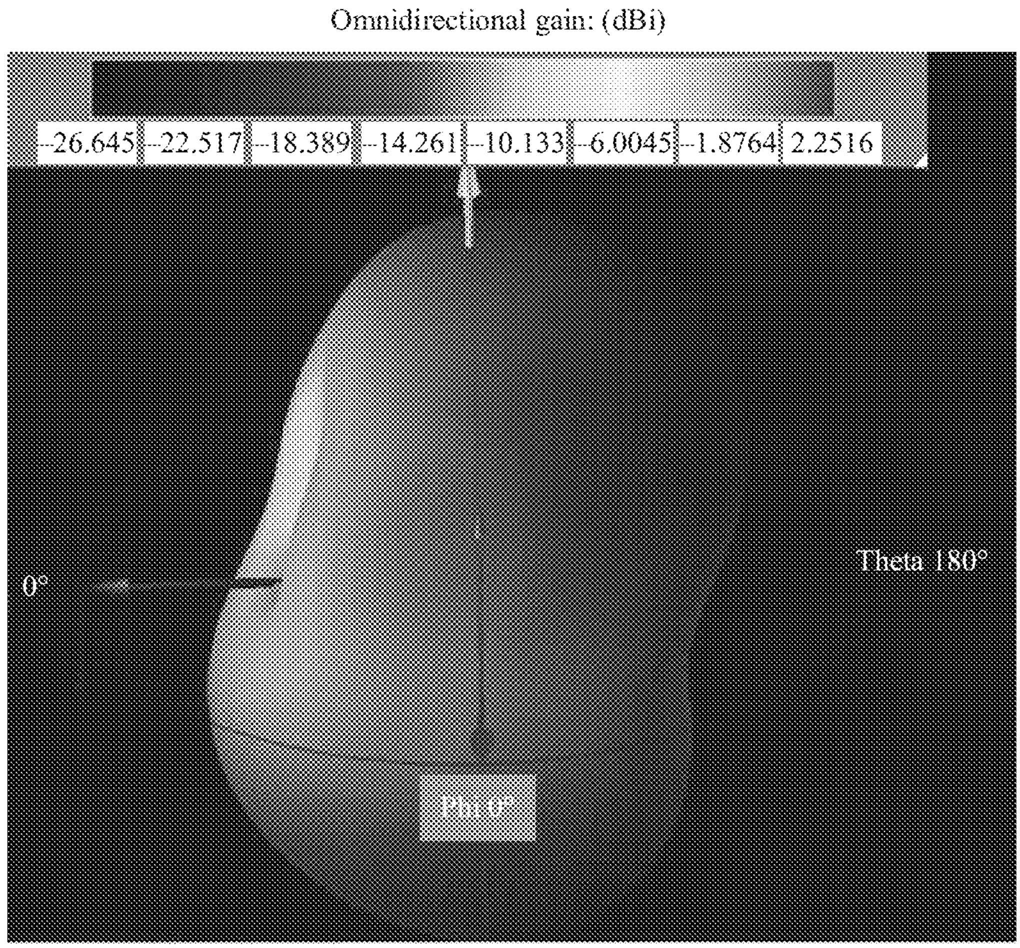
FIG. 10 shows a 3D directivity pattern of the antenna shown in FIG. 8.
Figure 11:
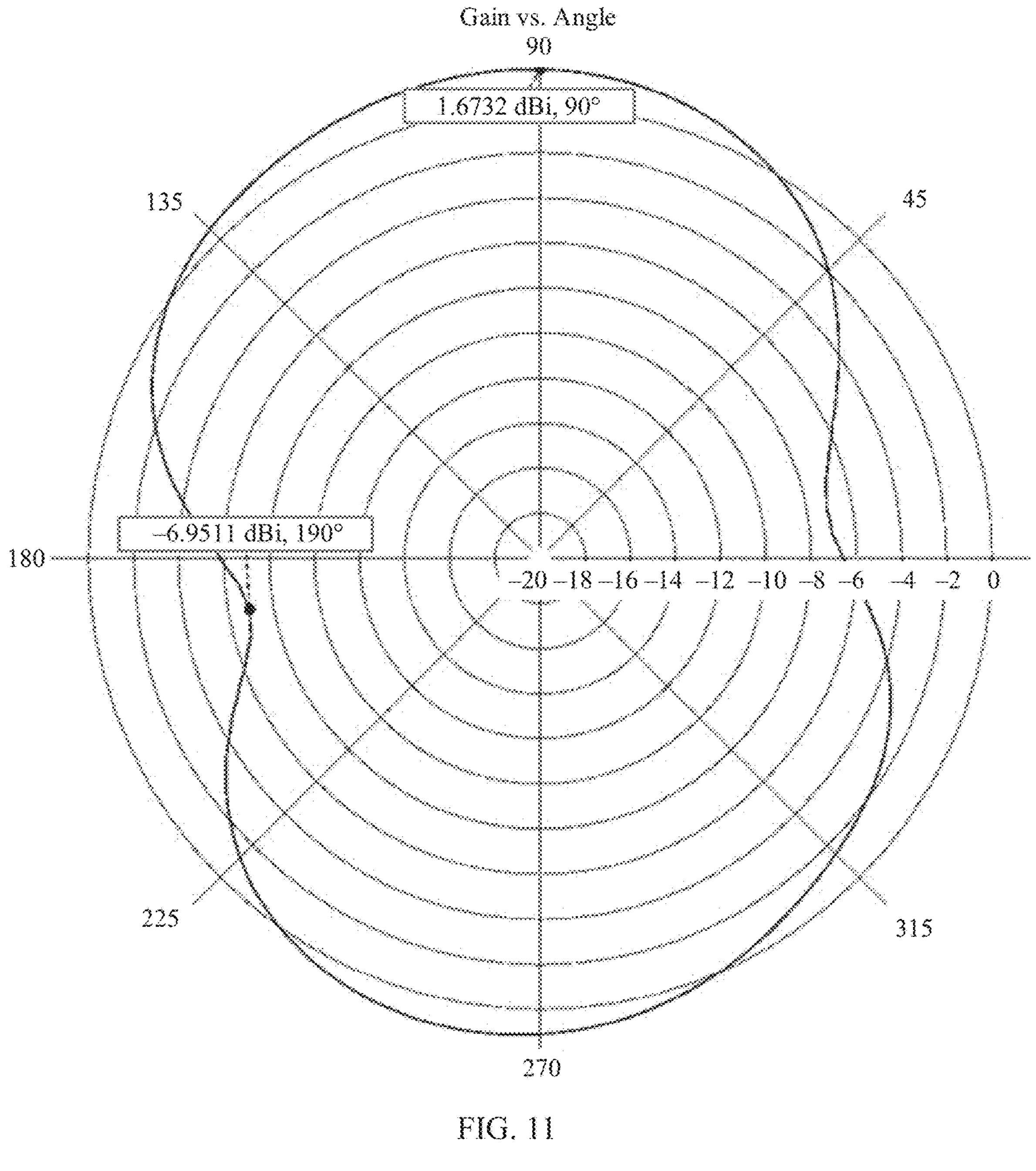
FIG. 11 shows antenna pattern roundness of the antenna shown in FIG. 7 in a horizontal direction.
Figure 12:
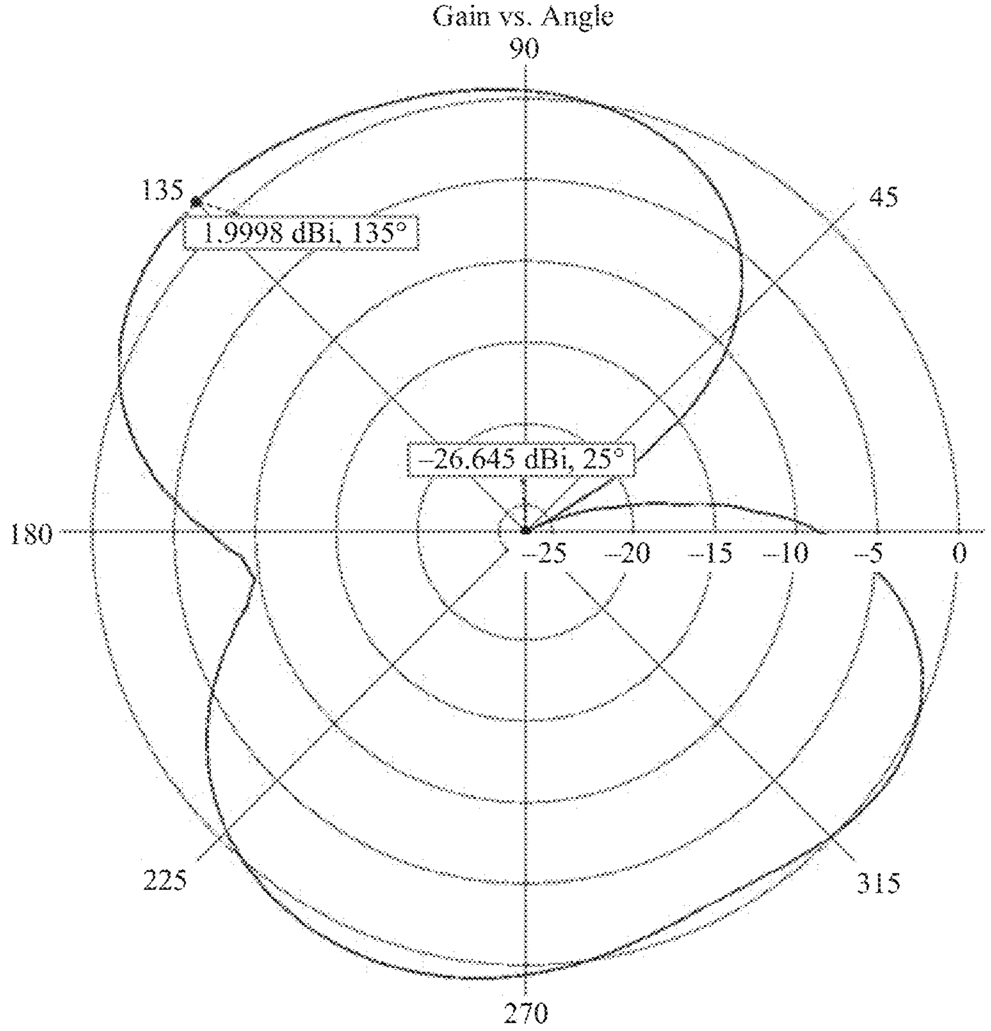
FIG. 12 shows antenna pattern roundness of the antenna shown in FIG. 8 in a horizontal direction.
Figure 13:
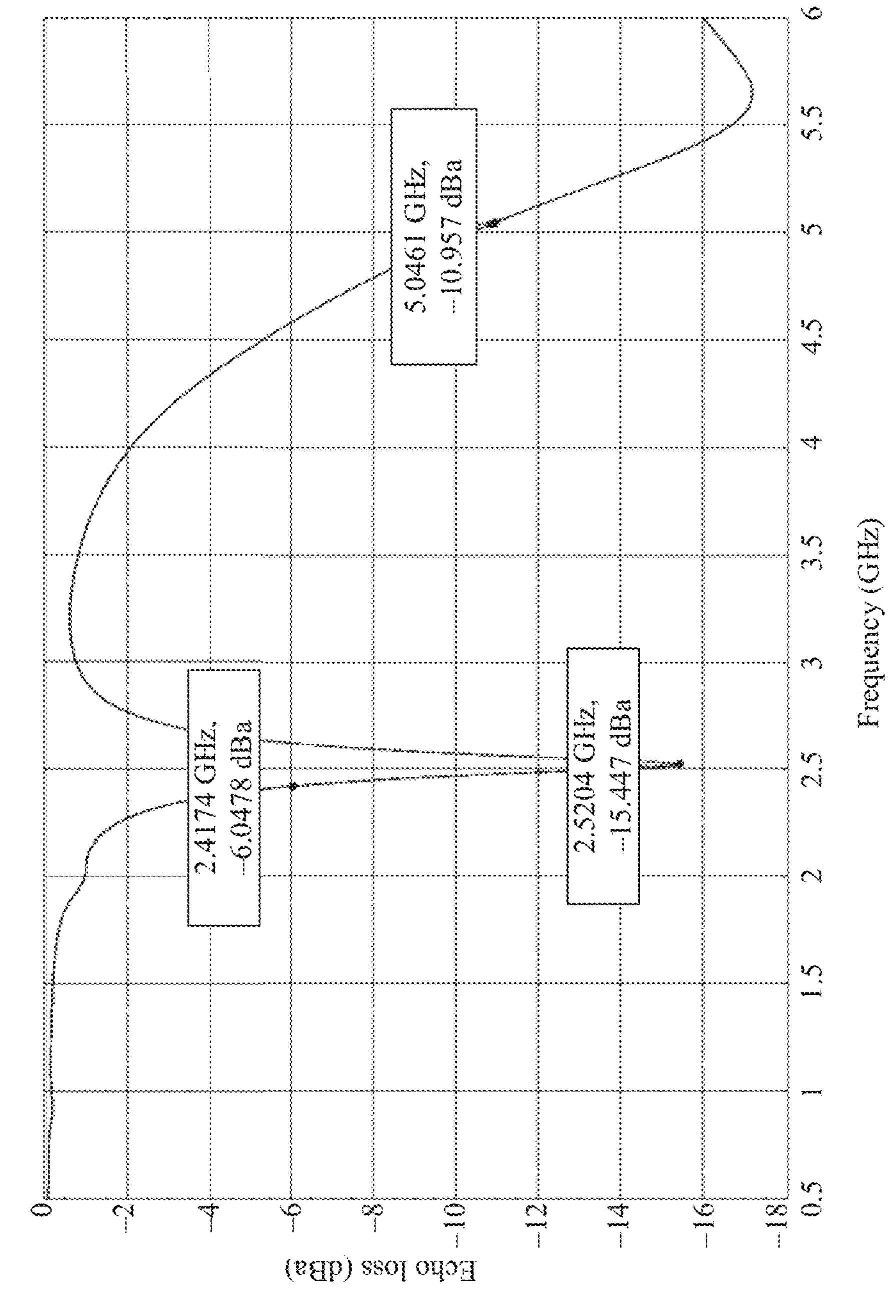
FIG. 13 is a standing wave diagram of the antenna shown in FIG. 7.
Figure 14:
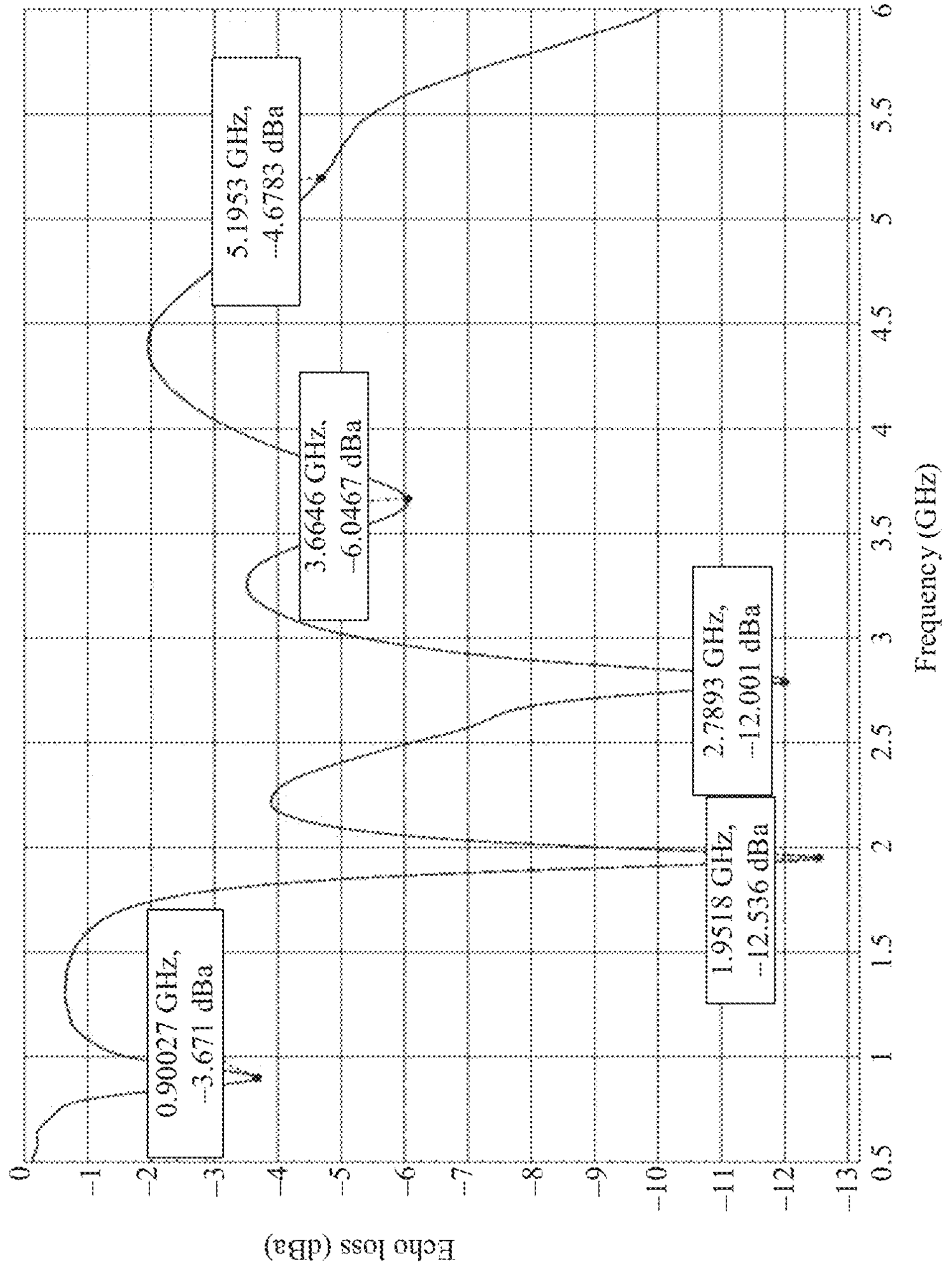
FIG. 14 is a standing wave diagram of the antenna shown in FIG. 8.

FIG. 7 shows a structure of an antenna according to an embodiment of this application. In addition to the antenna 100 provided in the foregoing embodiment of this application, the antenna structure shown in FIG. 7 further includes a cable 200 connected to the antenna 100. FIG. 8 shows a dipole antenna 300 in the conventional technologies. The antenna 300 includes only two symmetrical radiators 301 and a feeder configured to feed the radiators. Simulation is performed on the two antennas shown in FIG. 7 and FIG. 8. FIG. 9 shows a 3D directivity pattern of the antenna 100 provided in this embodiment of this application. FIG. 10 shows a 3D directivity pattern of the antenna 300 shown in FIG. 8. "Directivity total" refers to a directivity coefficient of the antenna. It can be learned from FIG. 9 that, the 3D directivity pattern of the antenna 100 provided in this embodiment of this application is a directivity pattern of a dipole-like form, and has a relatively low directivity and a relatively large minimum gain. It can be learned from FIG. 10 that, the 3D directivity pattern of the antenna 300 shown in FIG. 8 is a directivity pattern of a dipole-like form, and a concave point is relatively apparent and asymmetric. It can be learned from the comparison between FIG. 9 and FIG. 10 that, the 3D directivity pattern of the antenna provided in this embodiment of this application is definitely better than the 3D directivity pattern of the antenna in FIG. 8. A comparison is performed between FIG. 11 and FIG. 12. FIG. 11 shows antenna pattern roundness of the antenna provided in this embodiment of this application on the horizontal plane. FIG. 12 shows antenna pattern roundness of the antenna 300 shown in FIG. 8 on the horizontal plane. "Gain vs. Angle" is a gain versus an angle. It can be learned from FIG. 11 that, in the directivity pattern on the horizontal plane provided in this embodiment of this application, a concave area for the antenna provided in this embodiment of this application on the horizontal plane is relatively small, and the directivity pattern on the entire horizontal plane is approximately circular. It can be learned from FIG. 12 that, in the diagram of antenna pattern roundness of the antenna shown in FIG. 8 on the horizontal plane, there is an apparent concave area, and a disadvantage of apparent sharpness exists at a position of 25°. This causes poor radiation performance of the antenna on the horizontal plane. It can be learned from the comparison between FIG. 11 and FIG. 12 that, the antenna provided in this embodiment of this application improves antenna pattern roundness of an antenna on the horizontal plane, and improves antenna performance. A comparison is performed between FIG. 13 and FIG. 14. FIG. 13 is a standing wave diagram of the antenna provided in this embodiment of this application. FIG. 14 is a standing wave diagram of the antenna shown in FIG. 8. "|S11| VS Frequency" refers to an echo loss versus a frequency. In FIG. 13 and FIG. 14, a horizontal axis is a frequency, and a vertical axis is an echo loss. It can be learned from FIG. 13 that, a standing wave of the antenna provided in this embodiment of this application can cover all frequencies in 2.4G and 5G. It can be learned from FIG. 14 that, a standing wave of the antenna in the conventional technologies has a relatively large quantity of resonant frequencies, and cannot cover all frequencies in 2.4G and 5G. It can be learned from the comparison between FIG. 13 and FIG. 14 that, the antenna provided in this embodiment of this application has good performance in the 2.4G and 5G Wi-Fi bands.

Figure 15:
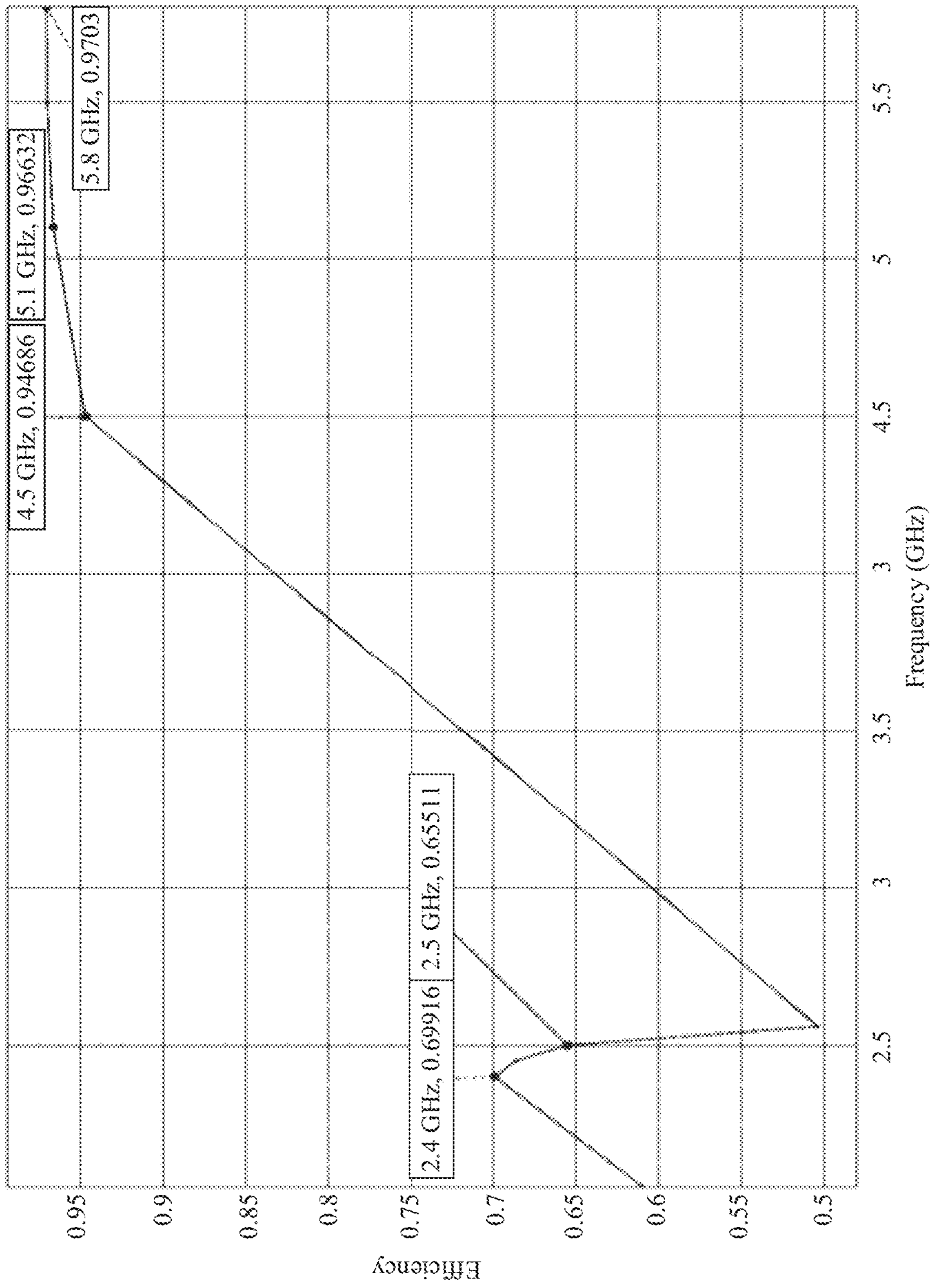
FIG. 15 is an efficiency diagram of the antenna shown in FIG. 7.

FIG. 15 shows efficiency of the antenna provided in this embodiment of this application. "Efficiency VS Frequency" is efficiency versus a frequency. In FIG. 15, a horizontal coordinate is a frequency, and a vertical coordinate is efficiency. It can be learned from FIG. 15 that, the antenna performance provided in this embodiment of this application has good efficiency in 2.4G and 5G Wi-Fi.

Figure 16:
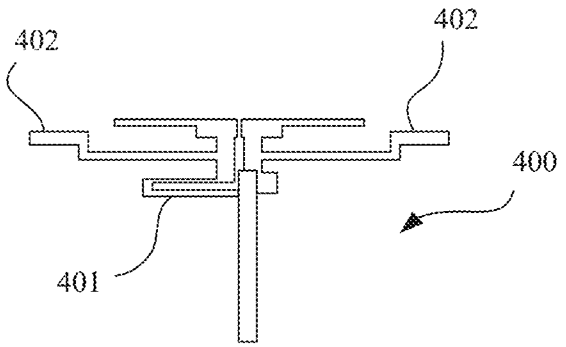
FIG. 16 is a schematic diagram of a structure of another comparison antenna according to an embodiment of this application.
Figure 17:
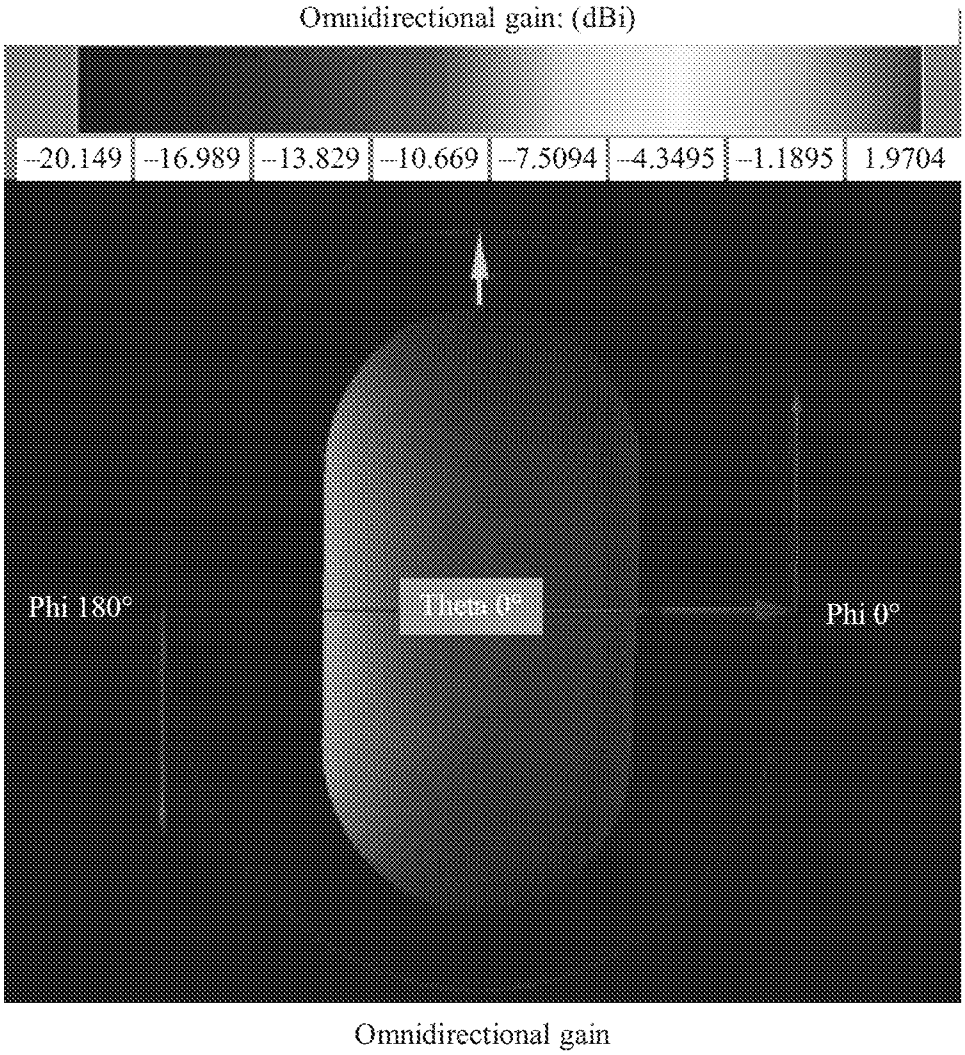
FIG. 17 shows a 3D directivity pattern of the antenna shown in FIG. 16.
Figure 18:
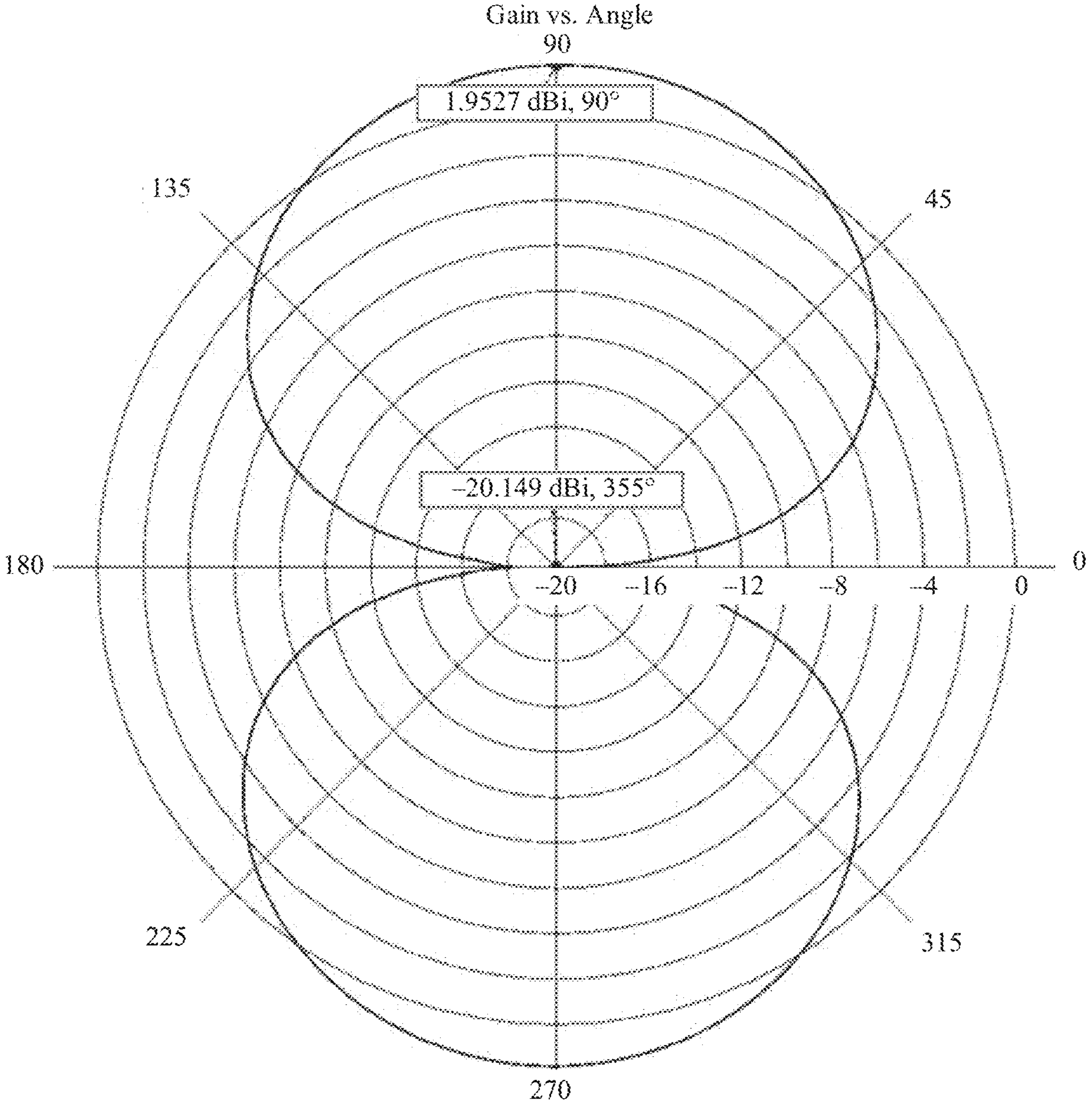
FIG. 18 shows antenna pattern roundness of the antenna shown in FIG. 16 in a horizontal direction.

FIG. 16 shows another antenna 400 for comparison. The antenna shown in FIG. 16 includes a balun structure 401 and two dipoles 402 connected to the balun structure 401. However there is no slot coupling between the antenna dipoles and the balun structure shown in FIG. 16. A comparison is performed between the antenna shown in FIG. 7 and the antenna shown in FIG. 16. A comparison is performed with FIG. 1, and referring to FIG. 9 and FIG. 17. FIG. 9 shows a 3D directivity pattern of the antenna provided in this embodiment of this application. FIG. 17 shows a 3D directivity pattern of the antenna shown in FIG. 16. It can be learned from FIG. 9 that, the 3D directivity pattern of the antenna provided in this embodiment of this application is a directivity pattern of a dipole-like form. It can be learned from FIG. 17 that, the 3D directivity pattern of the antenna shown in FIG. 16 is a directivity pattern of a standard dipole. It can be learned from the comparison between FIG. 9 and FIG. 17 that, the 3D directivity pattern of the antenna provided in this embodiment of this application is definitely better than the 3D directivity pattern of the antenna in FIG. 16. A comparison is performed between FIG. 11 and FIG. 18. FIG. 11 shows a directivity pattern of antenna pattern roundness of the antenna provided in this embodiment of this application on the horizontal plane. FIG. 18 shows a directivity pattern of antenna pattern roundness of the antenna shown in FIG. 16 on the horizontal plane. It can be learned from FIG. 11 that, in the directivity pattern of antenna pattern roundness provided in this embodiment of this application, a concave area for the antenna provided in this embodiment of this application on the horizontal plane is relatively small, and the diagram of antenna pattern roundness on the entire horizontal plane is approximately circular. It can be learned from FIG. 18 that, in the diagram of antenna pattern roundness of the antenna shown in FIG. 16 on the horizontal plane, there is an apparent concave area, and a disadvantage of apparent sharpness exists at 0° and 180°. This causes poor radiation performance of the antenna on the horizontal plane. It can be learned from the comparison between FIG. 11 and FIG. 18 that, the antenna provided in this embodiment of this application improves antenna pattern roundness of an antenna on the horizontal plane, and improves antenna performance.

It can be learned from the foregoing description that, in the antenna provided in this example of this application, a slot coupling is formed between the balun structure and the radiator, so that the antenna has two operating modes: the slot mode and the dipole mode. The slot mode improves a radiation effect of the antenna in the horizontal direction, and improves antenna performance.

An embodiment of this application further provides an antenna. The antenna includes a balun structure and a radiator unit. Refer to FIG. 1 and FIG. 2. The balun structure 10 is a U-shaped structure. The U-shaped structure includes a first structure 11, a second structure 12, and a third structure 13. The first structure 11 and the second structure 12 are arranged on two sides of the third structure 13, and are respectively connected to two opposite ends of the third structure 13 in a one-to-one correspondence. The radiator unit includes a first branch 20 located on one side of the U-shaped structure and a second branch 30 on the other side of the U-shaped structure. The first branch 20 includes a first strip-shaped structure (the second part 22 in FIG. 3). The first strip-shaped structure and the first structure 11 are connected to each other and have a first slot 40 in between. The second branch 30 includes a second strip-shaped structure (the fourth part 32 in FIG. 4). The second strip-shaped structure and the second structure 12 are connected to each other and have a second slot 50 in between. In the foregoing technical solution, through coordination of the slots with the first branch 20 and the second branch 30, radiation in both horizontal and vertical directions of the antenna is enhanced and antenna pattern roundness is increased.

When the first branch 20 is specifically connected to the balm structure 10, the first branch 20 is an inverted L-shaped structure. The first branch 20 includes the first strip-shaped structure and a third strip-shaped structure (the second part 21 in FIG. 3) connected to the first strip-shaped structure. The first strip-shaped structure is connected to the first structure 11 by using the third strip-shaped structure. A width of the first slot 40 is limited by a length of the third strip-shaped structure. The second branch 30 is an inverted L-shaped structure. The second branch 30 includes the second strip-shaped structure and a fourth strip-shaped structure (the third part 31 in FIG. 4) connected to the second strip-shaped structure. The second strip-shaped structure is connected to the second structure 12 by using the fourth strip-shaped structure. The width of the first slot 40 is limited by a length of the fourth strip-shaped structure. Simulation may be performed on the antenna by referring to the foregoing descriptions.

Figure 19:
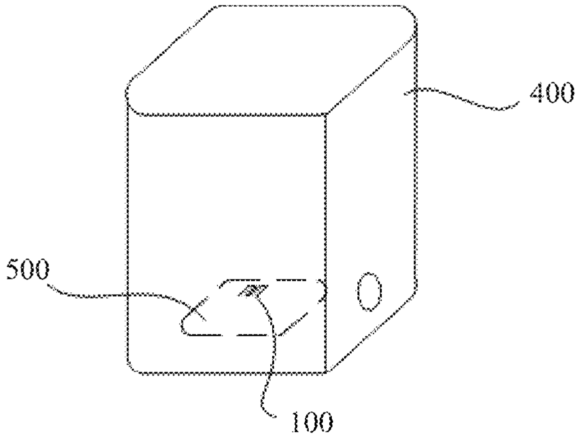
FIG. 19 is a schematic diagram of an electronic device according to an embodiment of this application.

FIG. 19 shows a device that applies the antenna provided in this example of this application according to an embodiment of this application. The device may be a router, customer premise equipment (CPE), or the like. The customer premise equipment is used as an example. The device includes a housing 400, a support layer 500 disposed in the housing 400, and the antenna 100 according to any one of the foregoing embodiments disposed at the support layer 500. The antenna 100 may be placed horizontally, vertically, or obliquely in customer premise equipment. The support layer 500 may be a circuit board or another structural layer with a supporting function in the customer premise equipment. In the antenna 100 provided in this example of this application, a slot coupling is formed between the balun structure and the radiator, so that the antenna 100 has two operating modes: a slot mode and a dipole mode. The slot mode improves a radiation effect of the antenna 100 in the horizontal direction, and improves performance of the antenna 100.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An antenna comprising:
a radiator; and
a balun structure coupled to the radiator and configured to feed the radiator, wherein the balun structure has a U-shaped structure and comprises:
a first side; and
a second side located opposite to the first side,
wherein the radiator comprises:
a first branch for a first current to flow through and arranged on the first side, wherein the first current flows in a first direction, wherein the first branch is spaced from the balun structure by a first slot, and wherein the first slot is configured to form a first horizontally-radiated electric field in a second direction based on the first current and a third current on the balun structure, wherein the first direction is perpendicular to the second direction; and
a second branch for a second current to flow through and arranged on the second side, wherein the second current flows in the first direction, wherein the second branch is spaced from the balun structure by a second slot, and wherein the second slot is configured to form a second horizontally-radiated electric field in the second direction based on the second current and the third current,
wherein the balun structure further comprises:
a first strip-shaped structure coupled to the first branch, wherein the first slot is formed between the first branch and the first strip-shaped structure; and
a second strip-shaped structure coupled to the second branch, wherein the second slot is formed between the second branch and the second strip-shaped structure,
wherein a first width of the first slot ranges from 0.5 millimeters (mm) to 4 mm, wherein a second width of the second slot ranges from 0.5 mm to 4 mm, wherein the width of the first slot is smaller than a width of the first branch, and wherein the width of the second slot is smaller than a width of the second branch, wherein a width of each of the first branch and the second branch ranges from 1 mm to 4 mm.

2. The antenna of claim 1, wherein the first horizontally-radiated electric field is formed between the first branch and the first strip-shaped structure, and wherein the second horizontally-radiated electric field is formed between the second branch and the second strip-shaped structure.

3. The antenna of claim 2, wherein the balun structure further comprises:
a feed point disposed on the first strip-shaped structure; and
a ground point disposed on the second strip-shaped structure.

4. The antenna of claim 3, wherein the first strip-shaped structure comprises:
a first end coupled to the first branch; and
a protrusion facing the second strip-shaped structure, and wherein the feed point is disposed at the protrusion.

5. The antenna of claim 3, wherein a current path length from the ground point to the feed point is ½ of a wavelength corresponding to an operating band of the antenna.

6. The antenna of claim 5, wherein the first branch is an L-shaped structure, wherein the second branch is an L-shaped structure, and wherein a first current path length of a first vertical part of the first branch is equal to a second current path length of a second vertical part of the second branch.

7. The antenna of claim 1, wherein the first branch and the second branch are symmetrical structures.

8. The antenna of claim 1, wherein a first current path length of the first branch is 0.15 to 0.35 times a wavelength corresponding to an operating band of the antenna, and wherein a second current path length of the second branch is 0.15 to 0.35 times the wavelength.

9. An antenna comprising:
a U-shaped structure comprising:
a first side and a second side on opposite sides of a centerline of the U-shaped structure;
a third structure having a first end and a second end opposite the first end;
a first structure coupled to the first end of the third structure, wherein the first structure comprises:
a first structure interior edge and a first structure exterior edge, wherein the first structure interior edge is closer to the centerline than the first structure exterior edge; and
a first structure end opposite the first end, wherein the first structure end comprises a first protrusion, and wherein the first protrusion is proximate to the first structure interior edge;
a second structure coupled to the second end of the third structure, wherein the second structure comprises:
a second structure interior edge and a second structure exterior edge, wherein the second structure interior edge is closer to the centerline than the second structure exterior edge; and
a second structure end opposite the second end, wherein the second structure end comprises a second protrusion, and wherein the second protrusion is proximate to the second structure interior edge;
a feed point disposed on the first protrusion; and
a ground point disposed on the second protrusion; and
a radiator comprising:
a first branch located on the first side of the U-shaped structure and comprising:
a first strip-shaped structure coupled to the first structure; and
a first slot located between the first strip-shaped structure and the first structure, wherein a first width of the first slot is less than a second width of the first branch; and
a second branch located on the second side of the U-shaped structure, comprising:
a second strip-shaped structure coupled to the second structure; and
a second slot located between the second strip-shaped structure and the second structure, wherein a third width of the second slot is less than a fourth width of the second branch.

10. The antenna of claim 9, wherein the first branch is an inverted L-shaped structure, wherein the first branch further comprises a third strip-shaped structure coupled to the first strip-shaped structure, and wherein the first strip-shaped structure is further coupled to the first structure using the third strip-shaped structure.

11. The antenna of claim 9, wherein the second branch is an inverted L-shaped structure, wherein the second branch further comprises a fourth strip-shaped structure coupled to the second strip-shaped structure, and wherein the second strip-shaped structure is further coupled to the second structure using the fourth strip-shaped structure.

12. The antenna of claim 9, wherein the first width of the first slot ranges from 0.5 millimeters (mm) to 4 mm, wherein the third width of the second slot ranges from 0.5 mm to 4 mm, wherein a width of each of the first branch and the second branch ranges from 1 mm to 4 mm, wherein the width of the first slot is smaller than a width of the first branch, and wherein the width of the second slot is smaller than a width of the second branch.

13. An electronic device comprising:

an antenna comprising:

a U-shaped structure comprising:

a first side and a second side;

a third structure having a first end and a second end opposite the first end;

a first structure coupled to the first end of the third structure; and a second structure coupled to the second end of the third structure; and a radiator comprising:

a first branch located on the first side of the U-Shaped structure and comprising:

a first strip-shaped structure coupled to the first structure; and a first slot located between the first strip-shaped structure and the first structure, wherein a first width of the first slot is less than a second width of the first branch, and wherein the first slot is configured to form a first horizontally-radiated electric field in a first direction; and a second branch located on the second side of the U-Shaped structure and comprising:

a second strip-shaped structure coupled to the second structure; and a second slot located between the second strip-shaped structure and the second structure, wherein a third width of the second slot is less than a fourth width of the second branch, and wherein the second slot is configured to form a second horizontally-radiated electric field in the first direction, wherein the first width of the first slot ranges from 0.5 millimeters (mm) to 4 mm, wherein the third width of the second slot ranges from 0.5 mm to 4 mm, wherein the width of the first slot is smaller than a width of the first branch, and wherein the width of the second slot is smaller than a width of the second branch, and wherein a width of each of the first branch and the second branch ranges from 1 mm to 4 mm.

14. The electronic device of claim 13, wherein the first branch has an inverted L-shaped structure and further comprises a third strip-shaped structure coupled to the first strip-shaped structure, and wherein the first strip-shaped structure is further coupled to the first structure using the third strip-shaped structure.

15. The electronic device of claim 13, wherein the second branch is an inverted L-shaped structure and further comprises a fourth strip-shaped structure coupled to the second strip-shaped structure, and wherein the second strip-shaped structure is further coupled to the second structure using the fourth strip-shaped structure.

16. The electronic device of claim 13, wherein the first structure comprises a first structure end opposite the first end, wherein the first structure end comprises a first protrusion facing the second structure, wherein the second structure comprises a second structure end opposite the second end, wherein the second structure end comprises a second protrusion facing the first structure, and wherein the U-shaped structure further comprises:

a feed point disposed on the first protrusion; and a ground point disposed on the second protrusion.

* * * * *